United States Patent
Nakazawa et al.

(10) Patent No.: US 12,425,199 B2
(45) Date of Patent: Sep. 23, 2025

(54) CRYPTOGRAPHIC COMMUNICATION PATH MONITORING SYSTEM AND MONITORING METHOD

(71) Applicants: KABUSHIKI KAISHA TOSHIBA, Tokyo (JP); TOSHIBA DIGITAL SOLUTIONS CORPORATION, Kawasaki (JP)

(72) Inventors: Mai Nakazawa, Tokyo (JP); Masakatsu Matsuo, Tokyo (JP); Manabu Kobayashi, Tokyo (JP); Koki Ando, Tokyo (JP)

(73) Assignees: Kabushiki Kaisha Toshiba, Tokyo (JP); Toshiba Digital Solutions Corporation, Kawasaki (JP)

( * ) Notice: Subject to any disclaimer, the term of this patent is extended or adjusted under 35 U.S.C. 154(b) by 259 days.

(21) Appl. No.: 18/445,067

(22) Filed: Mar. 29, 2023

(65) Prior Publication Data

US 2023/0318816 A1    Oct. 5, 2023

(30) Foreign Application Priority Data

Mar. 29, 2022   (JP) ................. 2022-052829

(51) Int. Cl.
*H04L 9/08* (2006.01)
*H04L 9/32* (2006.01)

(52) U.S. Cl.
CPC ............ *H04L 9/085* (2013.01); *H04L 9/0825* (2013.01); *H04L 9/3236* (2013.01)

(58) Field of Classification Search
CPC ..... H04L 9/085; H04L 9/0825; H04L 9/3236; G06F 21/606
See application file for complete search history.

(56) References Cited

U.S. PATENT DOCUMENTS

| 5,600,722 | A | 2/1997 | Yamaguchi et al. |
| 12,056,549 | B1 * | 8/2024 | Lablans ................ H04L 9/3066 |
| 2007/0250627 | A1 * | 10/2007 | May ........................ H04L 67/02 709/225 |

(Continued)

FOREIGN PATENT DOCUMENTS

| JP | H7-107083 A | 4/1995 |
| JP | 2007-200076 A | 8/2007 |

(Continued)

OTHER PUBLICATIONS

Norikazu Hosaka et al., "Secret Sharing Scheme and Its Applications," Toshiba Review, vol. 62, No. 7, pp. 23-26 (2007).

(Continued)

*Primary Examiner* — J. Brant Murphy
(74) *Attorney, Agent, or Firm* — Finnegan, Henderson Farabow, Garrett & Dunner, LLP (57) ABSTRACT

According to one embodiment, a first key sharing module outputs a common key, a first cryptographic module encrypts plaintext data and outputs encrypted data. A first transmission system transmits the encrypted data. A second transmission system transmits the common key. A monitor device is disposed in the first transmission system, and receives transmission condition data from a first base and reception condition data from a second base, and performs matching of the transmission condition data and the reception condition data.

7 Claims, 9 Drawing Sheets

(56) References Cited

U.S. PATENT DOCUMENTS

| | | | |
|---|---|---|---|
| 2009/0144550 A1* | 6/2009 | Arunan | H04L 63/068 |
| | | | 713/171 |
| 2014/0112478 A1 | 4/2014 | Arahira | |
| 2017/0277775 A1* | 9/2017 | Eigner | H04L 9/08 |
| 2021/0160064 A1* | 5/2021 | Harata | H04L 9/0891 |
| 2021/0409202 A1 | 12/2021 | Doi et al. | |
| 2022/0092184 A1 | 3/2022 | Trim et al. | |
| 2022/0182367 A1* | 6/2022 | Mieno | H04L 63/061 |
| 2025/0039041 A1* | 1/2025 | Smith | H04L 67/562 |

FOREIGN PATENT DOCUMENTS

| | | |
|---|---|---|
| JP | 2010-239352 A | 10/2010 |
| JP | 2014-86802 A | 5/2014 |
| JP | 5685735 B2 | 3/2015 |
| JP | 2017-69626 A | 4/2017 |
| JP | 2022-6778 A | 1/2022 |
| WO | WO 2012/133952 A1 | 10/2012 |

OTHER PUBLICATIONS

Japan Patent Office, Office Action in JP App. No. 2022-052829, 5 pages, and machine translation, 5 pages (Dec. 17, 2024).

* cited by examiner

CRYPTOGRAPHIC COMMUNICATION PATH MONITORING SYSTEM AND MONITORING METHOD

CROSS-REFERENCE TO RELATED APPLICATIONS

This application is based upon and claims the benefit of priority from Japanese Patent Application No. 2022-052829, filed Mar. 29, 2022, the entire contents of which are incorporated herein by reference.

FIELD

Embodiments described herein relate generally to a cryptographic communication path monitoring system and monitoring method with high security in a communication system, and further relate to a common key processing system.

BACKGROUND

There are cryptographic communication systems performing cryptographic communication using a device common key. Such a cryptographic communication system is configured to transmit encrypted data from a sender base A (or user base A) to a receiver base B (or user base B). The encrypted data are plaintext data encrypted with a common key (encryption key, random number key, or shared key).

The common key is generated in a base C (or base station C). The base C includes a common key generation device and a key delivery device, and transmits the common key to the base A. In that case, the common key is transmitted from the base C to the base A through a conventional line (Internet). Furthermore, the base C transmits the common key to a base D (or base station D) through a normal line (for example, telephone line).

Upon receipt of the common key, the base station D transmits the common key to the base B through the conventional line (Internet). Accordingly, the base B can decrypt the received encrypted data using the common key in the cryptographic module.

In recent years, the importance for cryptographic communication has been increased, and higher security for the transmitted/received data is demanded.

DETAILED DESCRIPTION

In general, according to one embodiment, the present application presents a cryptographic communication path monitoring system with a monitor device. The monitor device is configured to monitor a communication condition in order to detect intercept, thereby improving the credibility of communication, and a common key processing system of the same effect.

Furthermore, in addition, the present application presents a cryptographic communication path monitoring system and monitoring method in which a key preparation and delivery method or a key preparation and delivery means for converting the plaintext data to encrypted data or encrypted data to plaintext data is improved for better prevention of key intercept.

Embodiments will be explained with reference to the accompanying drawings.

Figure 1:
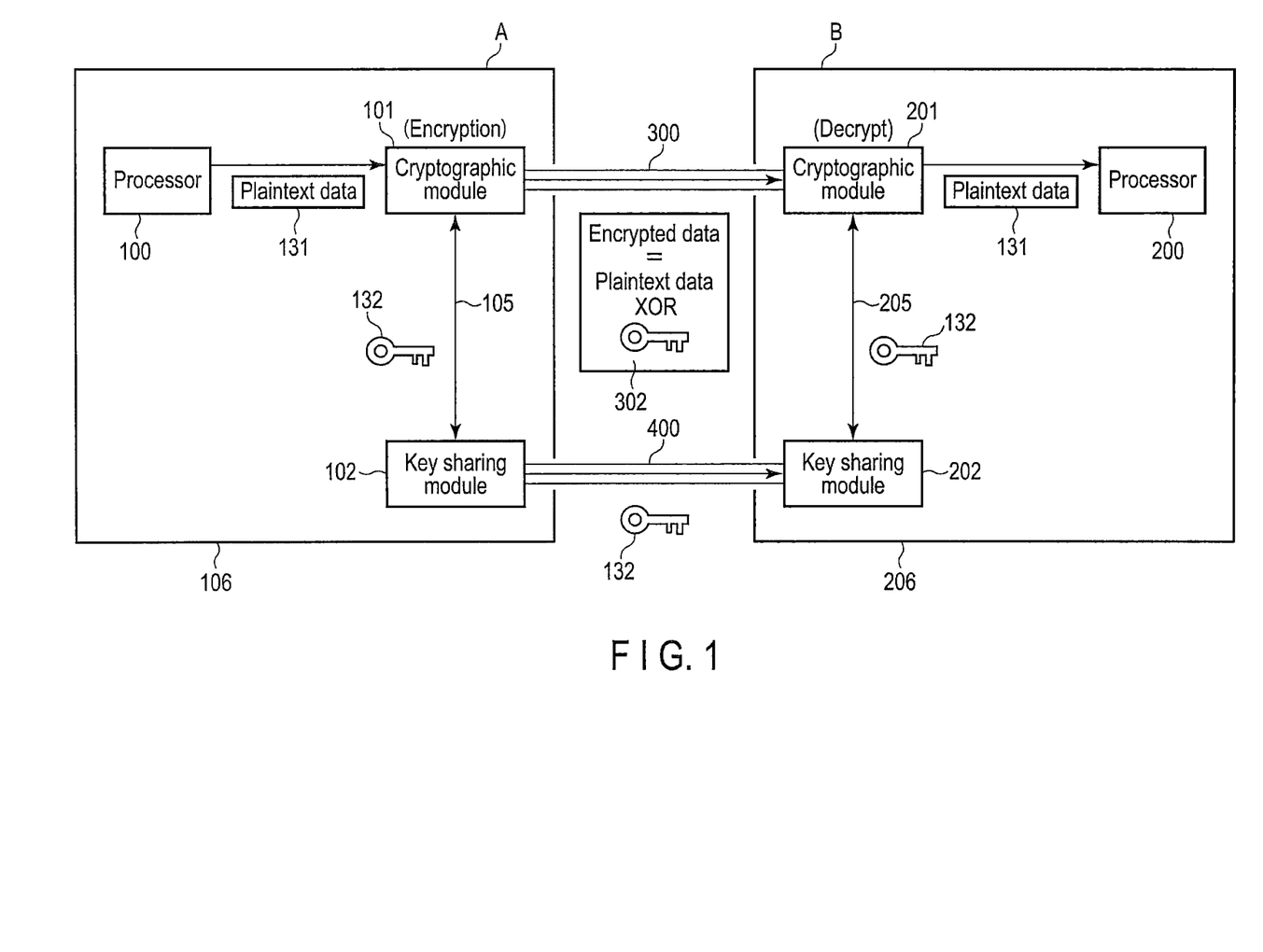
FIG. 1 illustrates the structure of a cryptographic communication system of an embodiment.

FIG. 1 illustrates an embodiment of the present application. In this example, A is a sender first base (or user device A), and B is a receiver second base (or user device B). Note that the bases A and B are mutually communicable; however, in this example, the first base A is a sender base and the second base B is a receiver base.

The first base A includes a processor 100, cryptographic module 101, and key sharing module 102. The second base B includes a processor 200, cryptographic module 201, and key sharing module 202. Note that the key sharing module 102 may be referred to as cellular module if a mobile phone net (hereinafter referred to as mobile net) is used for distribution of a common key.

In the first base A, plaintext data 131 and common key 132 are supplied to the cryptographic module 101 under the control of the processor 100. The cryptographic module 101 encrypts the plaintext data 131 using the common key 132. Note that, the plaintext data 131 is read from a memory device which is now shown.

Encrypted data 302 is transmitted to the cryptographic module 201 of the second base B through a first transmission system 300. The encrypted data 302 is data prepared by performing an exclusive or (hereinafter, XOR) operation of, for example, the plaintext data 131 and the common key 132. Furthermore, the first transmission system 300 is, for example, the Internet.

On the other hand, the common key 132 is transmitted from the key sharing module 102 to the key sharing module 202 of the second base B through the second transmission system 400. The second transmission system 400 is, for example, a mobile net.

In the second base B, the plaintext data 131 is decrypted as follows.

Upon receipt of the common key 132, the key sharing module 202 supplies the common key 132 to the cryptographic module 201. The cryptographic module 201 uses the common key 132 to decrypt the encrypted data 302. The decrypted plaintext data 131 is stored in a memory device based on the control of the processor 200.

In the aforementioned explanation, the plaintext data 131 of the base A is encrypted and is transmitted to the base B. However, plaintext data of the base B may be encrypted and be transmitted to the base A in a similar manner as explained above.

According to the aforementioned embodiment, the cryptographic module 101 and the key sharing module 102 of the base A are integrated with each other, thus the arrangement of the both modules is not far separated. That is, the cryptographic module 101 and the key sharing module 102 are arranged in a single management area (or may be referred to as private area).

For example, the cryptographic module 101 and the key sharing module 102 are accommodated in one box or on one substrate in, for example, a hospital, factory, building owned by a user A, or floor. The same applies to the base B.

Therefore, a transmission path 105 of the common key in the base A is managed by a user of the base A. That is, the transmission path 105 of the common key exists inside the box owned by the user of the base A, management area, or building 106. Thus, the common key of the base A is not easily stolen, and the system security is secured. The same applies to the base B. That is, a transmission path 205 of the common key 132 exists inside the box owned by the user of the base B, management area, or building 206, and the security of the common key of the base B is high, and the system security is secured.

In the aforementioned embodiment, the common key is stored in a memory device which is not shown. Then, what data is used for the preparation of the common key, and where the common key is prepared will be explained. In this system, since the key sharing module and the cryptographic module are integrated with each other as mentioned above, and a method of obtaining a common key is an important technical matter. That is, a distribution system of the common key, preparation of the common key, distribution method, or preparation and distribution means are important.

Figure 2A:
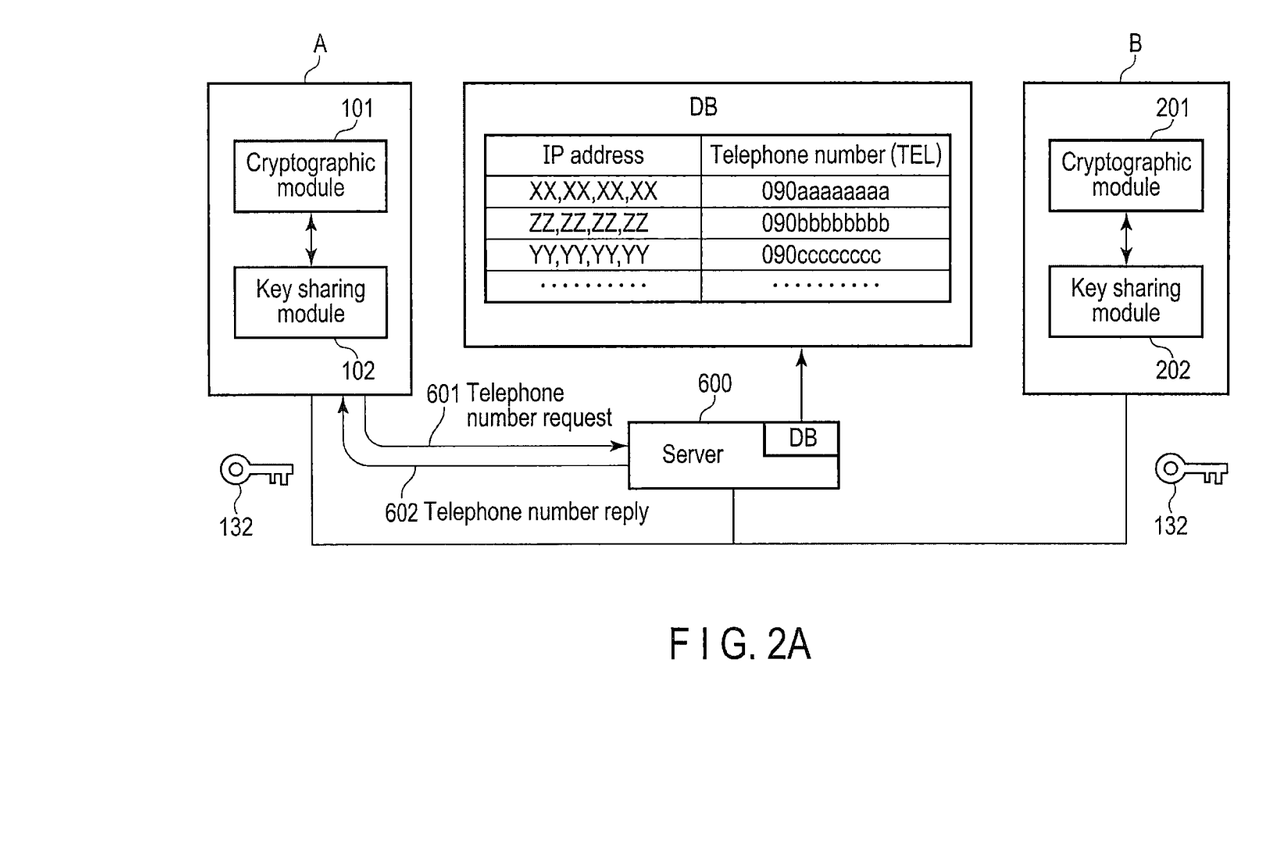
FIG. 2A illustrates the structure of a cryptographic communication system of another embodiment, using associated IP addresses and telephone numbers with a cloud intermediation.
Figure 2B:
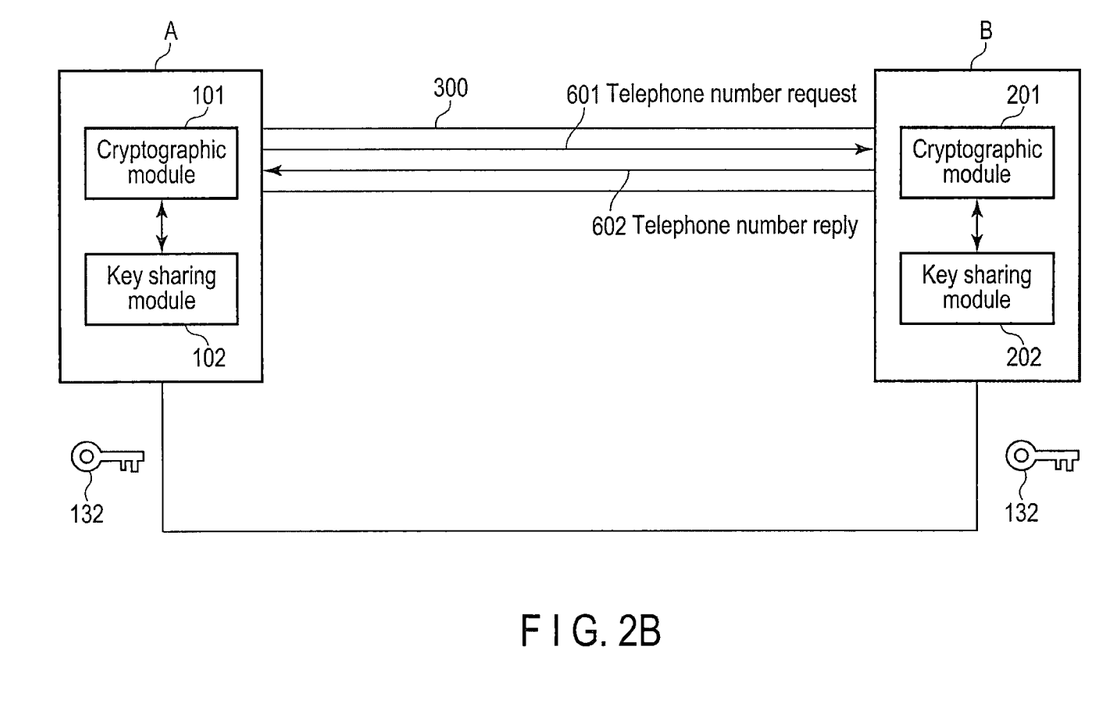
FIG. 2B illustrates the structure of a cryptographic communication system of yet another embodiment, using associated IP addresses and telephone numbers directly between bases A and B.

FIGS. 2A and 2B illustrate how the second transmission system 400 to distribute a common key is established in order to share the common key between the bases A and B while performing the communication of the cryptographic data therebetween. In this example, the first transmission system 300 is an IP net, and the second transmission system 400 is a mobile net. Furthermore, for simpler explanation, the communication is performed from the base A to the base B in this example. The communication from the base B to the base A is obviously performed in reverse.

Initially, the base A needs to establish the communication of the second transmission system 400 to transmit the common key 132 to the base B. Thus, the base A must acquire a telephone number of the base B directly or indirectly. There are two methods of such acquisition; that is, method 1, of acquiring the telephone number of the base B from a path management center (server 600) maintaining a database (DB) in which internet protocol (IP), addresses and telephone numbers are associated with as in FIG. 2A, and method 2 of acquiring the telephone number of the base B where the bases A and B directly communicate with IPs as in FIG. 2B.

Note that, in the method 1, the base A does not necessarily acquire the telephone number itself of the base B. The key sharing is achievable when the base A presents the IP address of the base B to the server 600 to request the transmission of the common key 132. That is, the key sharing is achievable when the base A indirectly recognizes the telephone number of the base B through the server 600. In that case, connection between the base A and the server 600 and connection between the server 600 and the base B are established by the mobile net, and the bases A and B are connected by the mobile net through the server 600.

In the first method 1 (example of FIG. 2A), the path management center (server 600) manages the IP address and the telephone number, etc., associated together. In this example, the base A (sender) initially presents the IP address of the base B (receiver) to the path management center (server 600) and requests the telephone number of the base B (receiver) (601), and acquires the telephone number (associated with the PI address) of the base B (602) (at that time, the base A recognizes the IP address of the base B).

Note that, in a case where the base A requests the server 600 for transmitting of the common key 132 of the base B, the base A does not necessarily acquire the telephone number of the base B. In this case, 601 is a request to the server 600 of a connection destination (base B) in the mobile net, and 602 is a response notifying whether or not the request is granted. Note that the communication of 602 may be omitted.

Note that the path management center may be arranged on the cloud.

The second method 2 (example of FIG. 2B) is a method in which the base A (sender) directly communicates with the base B (receiver) (and at that time, the base A recognizes the IP address of the base B), and the base A requests the telephone number from the base B (601), and acquires the telephone number of the base B (602). Note that, the method may be reversed such that the base A (sender) directly communicates with the base B (receiver) (and at that time, the base A recognizes the IP address of the base B), and the base A notifies the telephone number thereof to the base B (601), and the base B notifies an acknowledgement response (602). In that case, the communication connection of the second transmission system 400 is started from the base B. Furthermore, in that case, the communication of 602 may be omitted.

Through the aforementioned communication, the base A recognizes the telephone number of the base B in a direct or indirect manner.

Now, there are two key generation and delivery methods; that is, method 3 in which a key delivery center (server 600) generates and delivers a type of common key or a common key itself, and method 4 in which the base A generates and delivers a type of common key or a common key itself (hereinafter, the term of common key includes a type of common key). The method 4 in which the base A generates and delivers the common key is for sharing of the common key, and thus, the base A may entrust the base B of generation and delivery of the common key such that the base B performs the generation and delivery of the common key, which is method 5. Note that the key delivery center may be arranged on the cloud.

There are four combinations of the connection method, key generation method, and delivery method of the second transmission system 400, for example.

If the connection of the second transmission system 400 is achieved through the method 1 with the path management center and the key generation and delivery thereof are achieved through the method 3 with the key delivery center (type of FIG. 2A), the path management center and the key delivery center may be combined into one. Thus, the path management and the common key management are easily cooperative.

If the connection of the second transmission system 400 is achieved through the method 2 in which the bases perform inquiries with each other, and the key generation and delivery thereof are achieved through the method 4 in which the generation and delivery are performed in the base (type of FIG. 2B), the path management center is not necessary. This will be explained in detail below.

FIG. 2A illustrates an example with a database in which IP addresses and telephone numbers are associated with each other. The same elements as in FIG. 1 are referred to by the same reference numbers for explanation.

Now, the first transmission system 300 is the Internet, and the second transmission system 400 is the mobile net in this example. The server 600 stores a database DB in which IP addresses of each base and telephone numbers of each base are associated with each other.

When communication with the base B is demanded, the base A sends a request 601 to the server 600 for a telephone number of the base B. Then, the server 600 performs a telephone number reply 602 to the base A in response to the request. Accordingly, the base A can acquire the telephone number of the base B. Then, for example, the base A generates a common key. Furthermore, the base A encrypts plaintext data using the common key and sends the encrypted data to the base B through the Internet. Furthermore, the base A calls the telephone number of the base B to establish the communication route with the base B in the mobile net. Then, the base A transmits the common key to the base B using the mobile net. On the other hand, the base B receives the common key from the mobile net, and decrypts the encrypted data received through the Internet with the common key. At that time, the base B may add matching codes to the encrypted data, or the common key, or both of them such that the received encrypted data and the common key can be associated with.

FIG. 2B illustrates an example in which the) base A directly performs the telephone number request 601 with respect to the base B through the first transmission path 300 (Internet). The base B performs the telephone number reply 602 in response to the request. Thus, the base A can acquire the telephone number of the base B. Then, as mentioned above, the base A can self-generate the common key, or entrust the generation of key to an external device (key generator which is not shown, such as server 600). For example, the common key generation may be requested to the base B.

In the above example, the base A acquires the telephone number of the base B; however, the base B may acquire the telephone number of the base A in the same manner. That is, a type where the telephone number is acquired from the server 600, and a type where the telephone number is directly acquired from the other end of the communication (that is, base A).

As above, the base A or B needs to generate and deliver the common key separately from the acquisition of the telephone number of the other end.

There are various places where a common key 132 is generated. First, the base A will be explained.

Figure 3A:
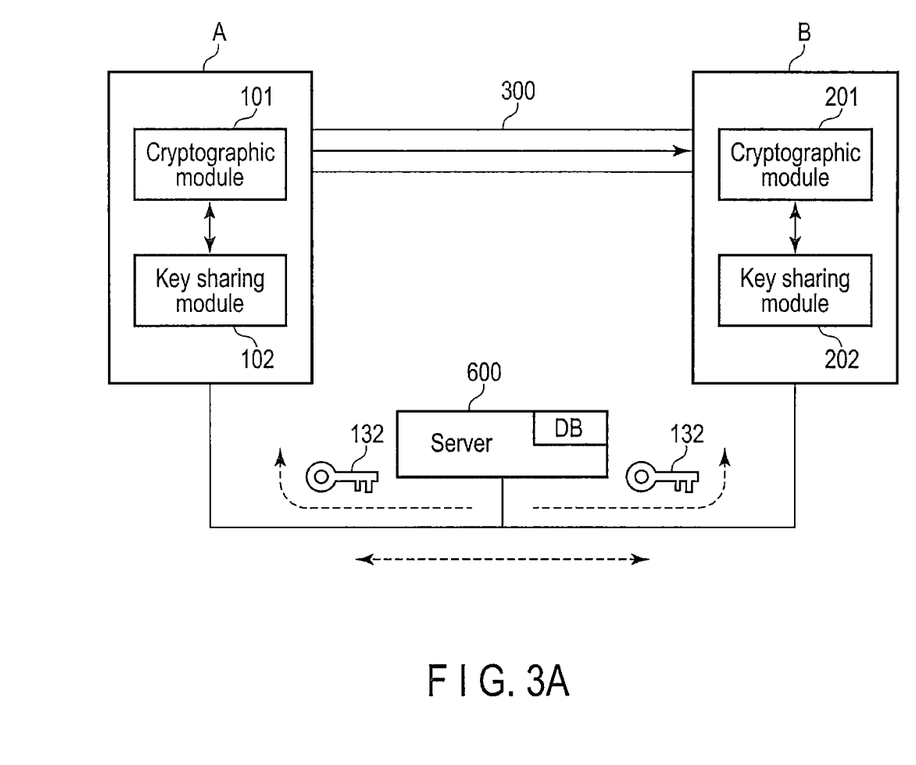
FIG. 3A illustrates the structure of a cryptographic communication system of yet another embodiment, using a common key generated in the cloud.

As in FIG. 3A, the base A establishes communication between the server 600 and the second path 400, and then, entrusts the server 600 to generate the common key 132. Then, the base A commands the server 600 to distribute the common key 132 to the base A through the second path 400. The base A transmits the common key 132 received from the server 600 to the base B through the second path 400. As another method, the server 600 may be commanded to distribute the common key 132 to the bases A and B through the second path 400.

Figure 3B:
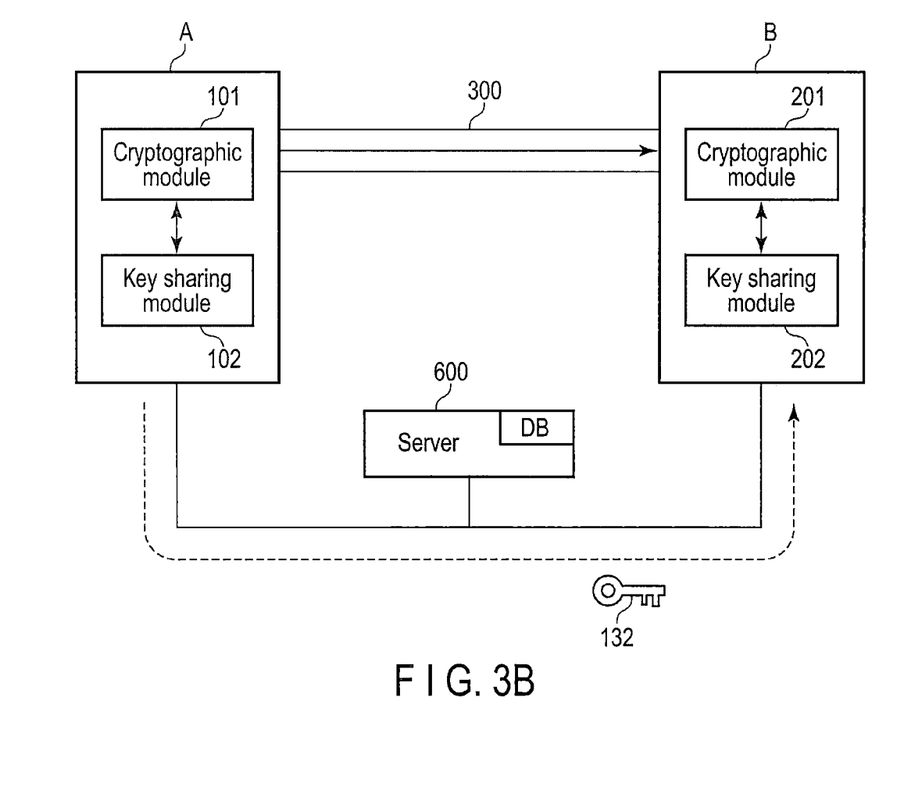
FIG. 3B illustrates the structure of a cryptographic communication system of yet another embodiment, using a common key generated in a base A.

Yet another example is shown in FIG. 3B.

That is, in FIG. 3B, the base A generates the common key 132. Then, the base A acquires the telephone number of the base B, and then, establishes the communication in the second path 400, and then, distributes the common key 132 to the base B through the second path. Note that, the common key 132 may not be generated in the base A, but may be generated by the server 600 upon entrust and received by the base A, and the telephone number of the base B is received, and then, the communication in the second path 400 is established, and then, the common key 132 may be distributed to the base B through the second path.

In the example of FIG. 3B, the common key 132 is generated by, for example, the key sharing module 102 of the base A, and note that, the base A may entrust the generation of the common key 132 to the base B using, for example, the Internet or the mobile net. In that case, the base B itself generates the common key 132, or the base B may entrust the generation of the common key 132 to the server 600. That is, there are various examples where the common key 132 is generated.

The bases A and B of the present system may include the following means. That is, the bases A and B may include means of generating a common key. Or, the bases A and B may include means of entrusting generation of the common key to an external server. Furthermore, the bases A and B may entrust the generation of common key to another base which is different from them. Furthermore, the generators may be changed based on a time band or a condition. Such changing functions may be easily provided within the system. Thus, the generating sources of the common key are apparently randomized, resulting improvement of the system security.

Figure 4:
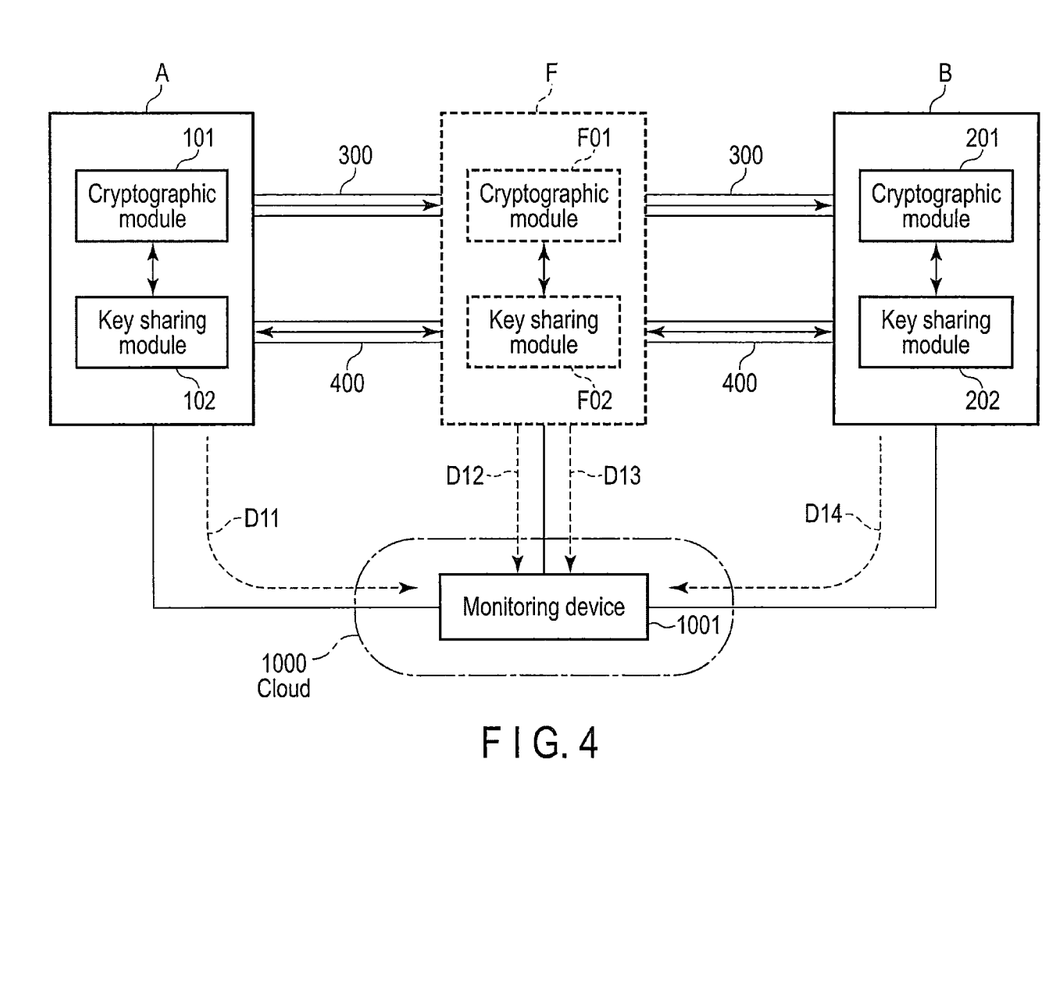
FIG. 4 illustrates the structure of a cryptographic communication system of yet another embodiment, in which a fake base F is interposed between bases A and B for prevention of intercept.

FIG. 4 illustrates the structural example of the present system with further improved security performance. For example, in this example, a base F is an attacker performing a man-in-the-middle attack. If the attacker (base F) intrudes between the bases A and B on the first transmission path 300 (for example, the Internet), and the attacker (base F) subscribes in the service of the second transmission system 400 (for example, mobile net) in which the bases A and B are participating, there is a risk that encrypted data and a shared common key are intercepted. The attacker (base F) mimics as the base B with respect to the base A and mimics as the base A with respect to the base B to first steal the common key and to possibly decrypt encrypted data with the stolen common key. However, such intercept can be prevented by the present embodiment.

Now, for example, a case where a fake base F (note that, base F is fake in this example but it may not be a fake depending on determination results) intrudes (is arranged) in the first transmission system 300 (Internet) and/or the second transmission system 400 (mobile net), and the intercept (relay) is performed will be considered. The fake base F includes a cryptographic module F01 and a key sharing module F02. The base F may possibly acquire a common key on the mobile net on the second transmission system 400 and intercept encrypted data on the first transmission system 300.

As a countermeasure against the intercept, the present system is configured such that if encrypted data and/or a common key is/are sent in an optional specific period, the bases A and B output the transmission condition data to a server (specifically, monitor device) 1001 on the cloud 1000 on the network (for example, the Internet). Furthermore, if encrypted data and/or a common key is/are received, the reception condition data is output to the monitor device 1001. Note that, the optional specific period (within a predetermined certain period of time) may be changed at various intervals based on the management of the system management organization, for example, and frequency thereof may be changed. Preferably, the specific period may be set immediately after a data transmission target (or a route thereto) is determined or a few minutes after such determination in order to decrease a large loss of data (load of intercept). Or, the specific period may be set immediately after a new file is transmitted after transmission of one file ends or a few minutes after such transmission of a new file starts.

Here, the transmission condition data and the reception condition data are data by which communication is identifiable. With the aforementioned structure, within a predetermined certain period of time, the monitor device 1001 can take in the transmission condition data D11, reception condition data D12, transmission condition data D13, and reception condition data D14 and check matching/mismatching conditions of such condition data. Condition data acknowledged by the monitor device 1001 are listed as follows.

Figure 5:
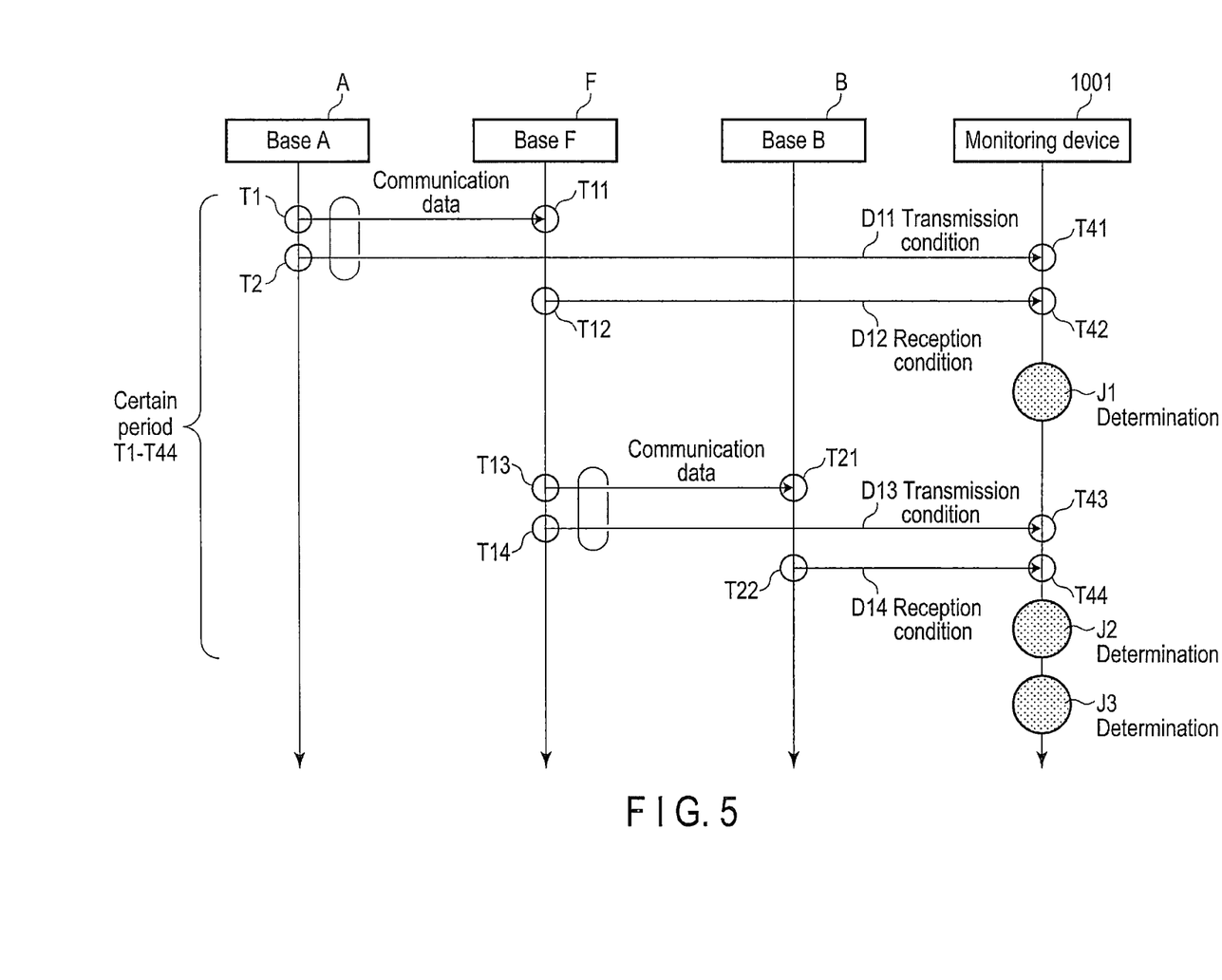
FIG. 5 illustrates an operation of a monitor device indicated to explain an operation between a specific period in the cryptographic communication system of FIG. 4.

Acknowledge 1: Transmission condition data D11 of base A with respect to signals from base A to base F Acknowledge 2: Reception condition data D12 of) base F with respect to signals from base A to base F Acknowledge 3: Transmission condition data D13 of base F with respect to signals from base F to base B Acknowledge 4: Reception condition data D12 of base B with respect to signals from base F to base B FIG. 5 illustrates an operation of the monitor device 1001 indicated to explain the operation in a specific period in the cryptographic communication system of FIG. 4.

The aforementioned transmission condition data and the reception condition data are collected in the monitor device 1001 within a specific period (T1 to T44). That is, the base A transmits communication data to the base F at timing T1 and transmits transmission condition data D11 to the monitor device 1001 at timing T2.

The base F receives communication data from the base A at timing T11, and transmits reception condition data D12 to the monitor device 1001 at timing T12. Furthermore, the base F transmits communication data to the base B at timing T13 and transmits transmission condition data D13 at timing T14. Furthermore, the base B receives communication data from the base F at timing T21 and transmits reception condition data D14 to the monitor device 1001 at timing T22.

The monitor device 1001 receives the transmission condition data D11 at timing T41, receives the reception condition data D12 at timing T42, receives the transmission condition data D13 at timing T43, and receives the reception condition data D14 at timing T44.

Determination J1: The monitor device 1001 compares D11 and D12 (that is, performs matching), and if D11=D12, determines that the communication is normal. If comparison shows that D11 and D12 are different, the monitor device 1001 determines the communication is abnormal. Note that the condition data of D11 and D12 are stored in a memory for a predetermined setting time. After the setting time, the condition data are erased.

Determination J2: The monitor device 1001 compares D13 and D14, and if D13=D14, determines that the communication is normal. If comparison shows that D13 and D14 are different, it determines the communication is abnormal.

Determination J3: The monitor device 1001 compares "D11=D12" and "D13=D14". Here, if "D11=D12"="D13=D14", it determines that the communication is abnormal (intercept, or man-in-the-middle attack is performed).

If "D11=D12" and "D13=D14" are different, the communication is determined to be normal.

The aforementioned determination can be made because it is obvious that the base A and the next base F are a pair (transmission condition data and reception condition data match) and the base F and the next base B are a pair (transmission condition data and reception condition data match), and communications on the. Internet within a certain time period (specific period) between the bases A and F and the bases F and B cannot totally match unless there is a man-in-the-middle attack.

The aforementioned determination J3 is interpreted as follows. That is, an attack by a man in the middle can be detected by monitoring the communication. All the bases are connected to the monitor device, and thereby the communication data is monitored. The monitor device 1001 monitors information about transmission condition of sender and reception condition of receiver in communication in a predetermined certain time period (specific period). The transmission condition and the reception condition are communication data and data which can identify communication.

Here, if the transmission condition and the reception condition do not match from a pair of the sender and receiver, it is determined that the sender or the receiver is invalid (an attacker). Thus, the attacker may fake a reception condition report or a transmission condition report in order to avoid detection of the man-in-the-middle attack; however, this is not executable. Even if it is faked, the report differs from the reception or transmission condition reported from the receiver or sender base, and the invalidity is notified at that time. Furthermore, if the transmission condition and the reception condition from a pair of the sender and receiver match, and one or both of the transmission condition and the reception condition of another pair match the aforementioned conditions, it is understood that invalid communication via the base F is being performed. That is, it is understood that the base F is performing the man-in-the-middle attack. Upon detection of invalidity, the monitor device 1001 sends warning to the bases related to the communication, or restricts the communication by shutting down and the like, in order to prevent the man-in-the-middle attack. Furthermore, the monitor device 1001 sends the aforementioned warning to the system management organization and the like.

Figure 6:
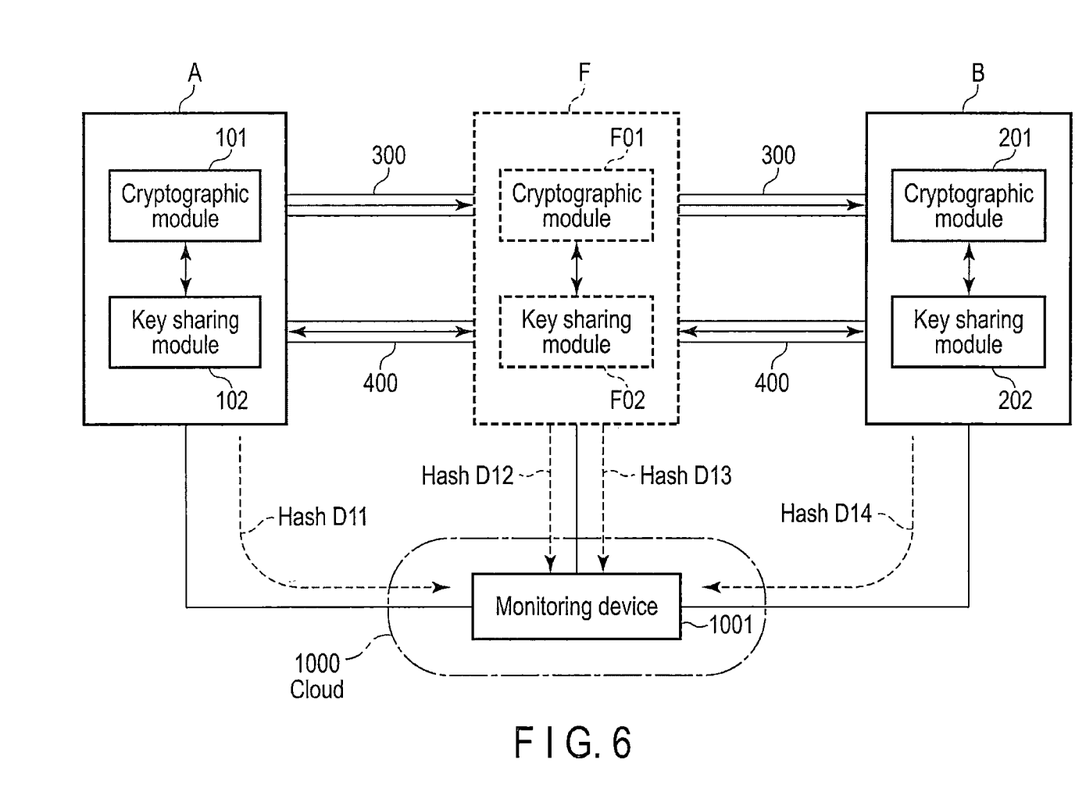
FIG. 6 illustrates the structure of a cryptographic communication system of another embodiment with respect to the embodiment of FIG. 4.

FIG. 6 illustrates the structure of a cryptographic communication system of another embodiment with respect to the embodiment of FIG. 4. The same elements as in FIG. 4 are referred to by the same reference numbers, and the explanation will be omitted. Instead of the transmission condition data, reception condition data of FIG. 4, hash values are used in this embodiment as follows.

Transmission condition data D11 of base A with respect to signals from base A to base F is Hash D11

Reception condition data D12 of base F with respect to signals from base A to base F is Hash D12

Transmission condition data D13 of base F with respect to signals from base F to base B is Hash D13

Reception condition data D12 of base B with respect to signals from base F to base B is Hash D14

In the present embodiment, determination of whether there is invalidity (attack) to the system is performed as in the determination method of FIG. 5 above. Using hash values can significantly decrease a communication data amount between the bases A, F, and B and the cloud, and thus, determination and process can be performed at a high speed. The aforementioned certain period can be shortened, and a load to the cryptographic communication is decreased.

In such a system, as with the aforementioned example, if transmission condition and reception condition from a pair of sender and receiver do not match, the sender or the receiver is invalid (attacker). Furthermore, if the transmission condition and the reception condition from a pair of the sender and receiver match and one or both of transmission condition and reception condition of another pair match the aforementioned transmission and reception conditions, it is understood that a man-in-the-middle attack is being performed. Upon detection of invalidity, the monitor device 1001 sends warning to the bases related to the communication, or restricts the communication by shutting down and the like in order to prevent the man-in-the-middle attack.

Note that, in the aforementioned explanation, for example, the base A transmits the common key to the base B through the second transmission system 400. The common key at that time is generated by one of various methods explained with reference to FIGS. 2A, 2B, 3A, and 3B.

Figure 7:
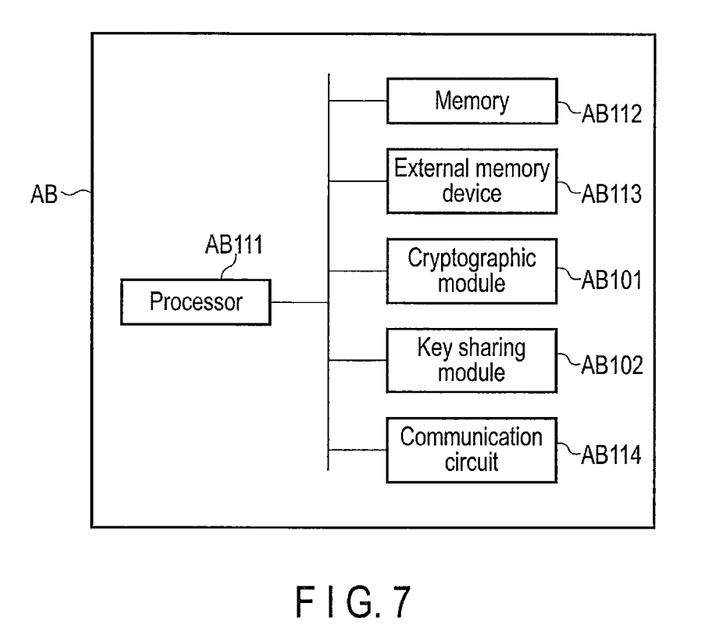
FIG. 7 is a schematic block diagram illustrating the internal structures of the bases A and B.

FIG. 7 is a schematic block diagram illustrating the internal structures of each of the bases A and B. The bases A and B have the same structure, and are structured on, for example, a substrate AB. A processor AB111 can collectively control memory AB112 on the substrate AB, cryptographic module AB101, key sharing module AB102, communication circuit AB114, and external memory device AB113. The external memory device AB113 may be arranged in a box together with the substrate AB, or may be connected outside the box.

According to the aforementioned cryptographic communication system and the cryptographic communication path monitoring system, even if the communication data (encrypted data and/or common key) is transmitted/received through a relatively open line (transmission system), invalid intercept can be immediately detected, thus providing high security performance.

Figure 8:
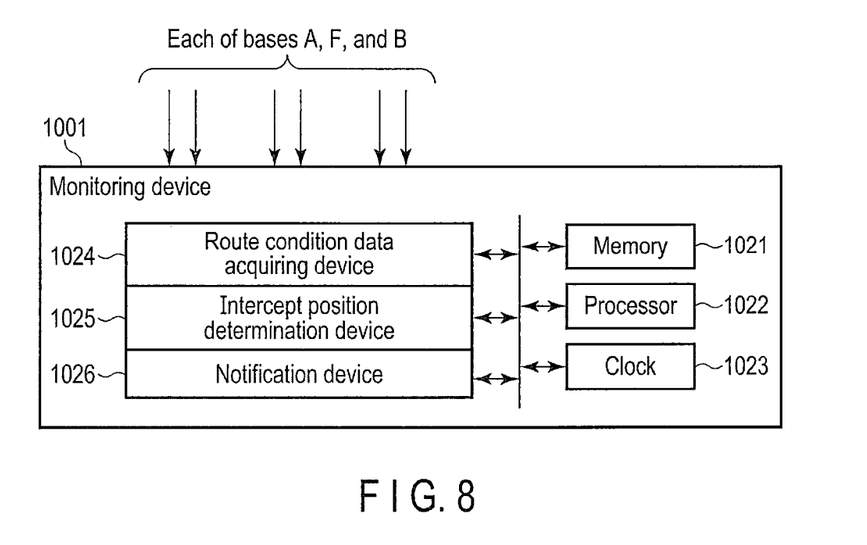
FIG. 8 illustrates a basic structural example of a monitor device 1001.

FIG. 8 illustrates the basic structure of the monitor device 1001. The monitor device 1001 includes a memory 1021, processor 1022, and clock 1023. Furthermore, the monitor device 1001 includes a condition data acquiring device 1024 configured to acquire data of transmission condition and reception condition from a route in which the common key is delivered, intercept position determination device 1025, and notification device 1026.

The processor 1022 collectively controls the aforementioned functioning parts in the monitor device 1001. At a specific period predetermined for monitoring, the processor 1022 starts monitoring based on time information from the clock 1023. The monitoring is performed as explained above with reference to FIGS. 4, 5, and 6. Note that the time information is not limited to a clock counting, but may depend on time information from a time server, and is not limited by the example here.

Note that, there are various setting methods of the specific period. For example, a start time is set periodically, or randomly, or a specific synchronization signal may be sent to each base such that the reception condition data and the transmission condition data are output from each base based on the synchronization signal. Furthermore, the specific period may be determined by the monitor device 1001.

Furthermore, the specific period may be a period between a start and an end of a series of communication (that is, a period in which a communication session is maintained).

The transmission condition data D11, reception condition data D12, transmission condition data D13, reception condition data D14 are acquired by the condition data acquiring device 1024, and stored in the memory 1021 for a while.

The intercept position determination device 1025 determines whether or not there is invalidity in communication as shown in FIG. 5. The determination process program is executed by the processor 1022. If the invalidity (intercept) is detected, the notification device 1026 is activated, a warning signal is notified to a user, \ system manager, or each base. Or, a warning signal is notified to a cloud service (for example, service of data base access in which telephone numbers and IP addresses are associated with) in order to eliminate the base F from the cloud service.

The concept of the present application is not limited to the aforementioned communication system. Some of the cryptographic communication systems adopt a quantum cryptographic communication technique. In such a system, cryptographic data is encrypted by a common key.

Therefore, the invention of the present application is applicable to a system in which a common key distribution route is a quantum cryptographic communication network.

A) The monitoring means of the aforementioned system is characterized as follows.

A1) A cryptographic communication path monitoring system including:
    a first key sharing module to output a common key;
    a first cryptographic module of a first base, to encrypt plaintext data using the common key and to output the encrypted data;
    a first transmission system to transmit the encrypted data from the first base to a second cryptographic module of a second base;
    a second transmission system to transmit the common key from the first key sharing module to a second key sharing module of the second base; and
    a monitor device disposed in the first transmission system, to receive at least transmission condition data from the first base and reception condition data from the second base in a predetermined optional period, and to perform matching of the transmission condition data and the reception condition data.

A2) The monitor device of A1 above includes a determination device to, if transmission condition data D11 from the first base, reception condition data D12 from the second base, transmission condition data D13 from the second base, and reception condition data D14 from a third base are received, perform matching of at least D11=D12, D13=D14, and "D11=D12"="D13=D14".

A3) The monitor device of A1 above includes means of easing at least a man-in-the-middle attack if aforementioned "D11=D12"="D13=D14". For example, such means is a notification device to send warning to the first base.

A4) In A1 above, hash values are used as the transmission condition data and the reception condition data.

A5) In A1 above, the monitor device is arranged in the Internet cloud.

A6) In A1 above, the monitor device is arranged in the Internet cloud together with a server, and the server stores telephone number information of at least multiple bases, where the information is usable for generation of the common key.

A7) In A1 above, the optional period is set to immediately after a new route to send the encrypted data is set, or a few minutes after transmission of the encrypted data is started in the new route.

A8) In A1 above, the first base includes the first cryptographic module and the first sharing module in a first private area, and the second base includes the second cryptographic module and the second key sharing module in a second private area. The private areas secure the transmission path between the key sharing module and the cryptographic module.

A9) A monitoring method of a cryptographic communication path, in which
a first key sharing module outputs a common key, and a first cryptographic module of a first base encrypts plaintext data using the common key and outputs the encrypted data,
a first transmission system transmits the encrypted data from the first base to a second cryptographic module of a second base, and
a second transmission system transmits the common key from the first key sharing module to a second key sharing module of the second base, wherein
in the first transmission system, at least transmission condition data from the first base and reception condition data from the second base are received in a predetermined optional period, and matching of the transmission condition data and the reception condition data is performed.

A10) In A9 above, if transmission condition data D11 from the first base, reception condition data D12 from the second base, transmission condition data D13 from the second base, and reception condition data D14 from a third base are received, matching of at least D11=D12, D13=D14, and "D11=D12"="D13=D14" is performed.

B) Furthermore, a common key processing system of the present system is characterized as follows.
B1) A common key processing system including:
a first key sharing module to output a common key;
a first cryptographic module of a first base, to encrypt plaintext data using the common key and to output encrypted data;
a first transmission system to transmit the encrypted data from the first base to a second cryptographic module of a second base; and
a second transmission system to transmit the common key from the first key sharing module to a second key sharing module of the second base, further including
a path management center arranged in the second transmission system (for example, mobile net) or on the cloud, and
a data base built in the path management center, the data base including IP addresses of the first base and the second base and telephone numbers corresponding to the IP addresses, wherein
at least the first base includes means of generating at least the common key by accessing to the data base of the path management center, and using the IP addresses and/or the telephone numbers.

B2) In B1 above, the common key is generated by the first base.

B3) In B1 above, the common key is generated by another node or another base entrusted by the first base.

C) Furthermore, the common key processing system of the present system is characterized as follows.
C1) A common key processing system including:
a first key sharing module to output a common key;
a first cryptographic module of a first base, to encrypt plaintext data using the common key and to output encrypted data;
a first transmission system to transmit the encrypted data from the first base to a second cryptographic module of a second base; and
a second transmission system to transmit the common key from the first key sharing module to a second key sharing module of the second base, wherein
at least the first base includes means of generating at least the common key by acquiring a telephone number of the second base via the Internet, and using the telephone number.

C2) In C1 above, the common key is generated by the first base.

C3) In C1 above, the common key is generated by another node or another base entrusted by the first base.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

Furthermore, even if each structural element of the claims is expressed as divided, or integrated with another structural element, or combined with another structural element, such expression is deemed within the scope of the invention. Furthermore, multiple embodiments may be combined, and examples realized by such a combination is within the scope of the invention.

Furthermore, figures may be schematically illustrated for further clarification of the explanation, and thus, width, thickness, shape, and the like are different from those of the actual embodiments. Furthermore, the present invention is applicable to a case where a claim is represented as a control logic, or as program including computer-executable instructions, or as computer readable recording medium describing the instructions. Furthermore, names and terms used in the claims are not limited thereto, and as long as the same contents and the same concepts are substantially kept, other expressions are deemed within the scope of the invention.

What is claimed is:

1. A cryptographic communication path monitoring system, comprising:
a first base comprising a first processor configured to;
output a common key;
encrypt plaintext data using the common key and to output encrypted data;
transmit the encrypted data from the first base to a second base via a first transmission system;
transmit the common key the second base via a second transmission system; and
a monitor device disposed in the first transmission system, and comprising a second processor configured to:
receive, in a predetermined period, at least transmission condition data from the first base and reception condition data from the second base and perform matching of the transmission condition data and the reception condition data;
upon receipt of transmission condition data D11 from the first base, reception condition data D12 from the second base, transmission condition data D13 from the second base, and reception condition data D14 from a third base, perform matching of at least D11=D12, and D13=D14, and "D11=D12"="D13=D14"; and if aforementioned "D11=D12"="D13=D14", transmit a warning to at least the first base.

2. The cryptographic communication path monitoring system of claim 1, wherein a hash value is used for the transmission condition data and the reception condition data.

3. The cryptographic communication path monitoring system of claim 1, wherein the monitor device is arranged in an Internet cloud.

4. The cryptographic communication path monitoring system of claim 1, wherein the monitor device is arranged in an Internet cloud together with a server, and the server stores telephone number information of at least a plurality of bases, where the information is usable for preparation of the common key.

5. The cryptographic communication path monitoring system of claim 1, wherein the predetermined period is set to be immediately after setting of a new route for transmission of the encrypted data or a few minutes after start of transmission of the encrypted data through the new route.

6. The cryptographic communication path monitoring system of claim 1, wherein the first base is arranged in a first private area, and the second base is arranged in a second private area.

7. A cryptographic communication path monitoring method comprising:

outputting, by a first base, a common key;

encrypting, by the first base, plaintext data using the common key and outputting encrypted data;

transmitting, by the first base, the encrypted data to a second base via a first transmission system;

transmitting, by the first base, the common key from the first base to the second base via a second transmission system;

receiving, by a monitor device in the first transmission system, in a predetermined period, at least transmission condition data from the first base and reception condition data from the second base, and performing matching of the transmission condition data and the reception condition data;

upon receipt of transmission condition data D11 from the first base, reception condition data D12 from the second base, transmission condition data D13 from the second base, and reception condition data D14 from a third base, performing, by the monitor device, matching of at least D11=D12, and D13=D14, and "D11=D12"="D13=D14"; and if "D11=D12"="D13=D14", transmitting, by the monitor device, a warning to at least the first base.

* * * * *